United States Patent [19]

Häfner

[11] Patent Number: 4,711,127

[45] Date of Patent: Dec. 8, 1987

[54] METHOD AND APPARATUS FOR MEASURING THE PRESSURE OF A FLUID

[75] Inventor: Hans W. Häfner, Aichach-Walchshofen, Fed. Rep. of Germany

[73] Assignee: Pfister GmbH, Augsburg, Fed. Rep. of Germany

[21] Appl. No.: 842,650

[22] Filed: Mar. 21, 1986

[30] Foreign Application Priority Data

Apr. 25, 1985 [DE] Fed. Rep. of Germany ....... 3514911

[51] Int. Cl.$^4$ .......................... G01F 23/14; G01L 7/16
[52] U.S. Cl. ........................................ 73/302; 73/744
[58] Field of Search ................. 73/745, 746, 744, 302, 73/301, 299

[56] References Cited

FOREIGN PATENT DOCUMENTS

211212 6/1983 United Kingdom .................. 73/745

Primary Examiner—Donald O. Woodiel
Attorney, Agent, or Firm—Lowe, Price, LeBlanc, Becker & Shur

[57] ABSTRACT

An apparatus for measuring gas pressures including a piston slideably guided in a cylinder, at least one of the gas pressures acting on one of the two face surfaces of the piston the piston face forming a pressure chamber with the interior of said cylinder. Hydrostatic bearings are provided between the piston and the cylinder for relative movement therebetween essentially without friction. Hydrostatic liquid to hydrostatic bearings, at least one receptable connected to said pressure chamber for receiving any hydrostatic liquid penetrating from said hdyrostatic bearings into the pressure chamber. Provision is made for maintaining the hydrostatic liquid in the receptacle at a predetermined level, as well as for removing hydrostatic liquid from the receptacle under control of a level maintaining element and a force measuring element engaging the piston.

31 Claims, 10 Drawing Figures

METHOD AND APPARATUS FOR MEASURING THE PRESSURE OF A FLUID

TECHNICAL FIELD

The present invention relates to methods and devices for measuring a pressure, particularly the stationary or quasi-stationary pressure of a fluid utilizing a pressure-charged measuring system in a cylinder in which a piston is guided essentially without friction, the piston being in contact with a force measuring device.

BACKGROUND OF THE INVENTION

U.S. Pat. No. 4,491,016 discloses a method and apparaus for measuring a pressure as specified above, using a piston which is maintained contact-free within a cylinder by hydrostatic or pneumatic fluid supplied under pressure between the piston and the inner surface of the cylinder.

One problem encountered with such a measuring apparatus is the leaking of hydrostatic or pneumatic fluid into a measuring chamber confined at one side by the face wall of the piston and containing the gas or liquid under the pressure to be measured. This is particularly detrimental when a liquid is used as a hydrostatic fluid and the pressure of a gaseous medium is to be measured. In this case, the hydrostatic liquid will slowly but continuously rise in the measuring chamber and even fill the supply line for the gaseous medium. According to the embodiment of FIG. 5 of U.S. Pat. No. 4,491,016 a resilient separating element is disposed in the measuring apparatus such that only one side of the separating element is connected to a feed-line for the fluid to be measured and the other side of the separating element is in connection with a feed-line to the measuring chamber, and both are filled with the hydrostatic liquid. The separating element is held in a neutral position under equilibrium forces by monitoring means which controls a valve for releasing excess hydrostatic liquid. Such a design needs quite a number of additional elements for controlling a constant volume of the hydrostatic liquid and a separating element for separating the latter from the fluid to be measured. Furthermore, since the hydrostatic liquid is used as a pressure transmission means to the piston it would be inappropriate to use a pneumatic fluid instead of a hydrostatic liquid as a separating agent. Even using a hydrostatic liquid as a transmission means leads to measuring errors due to pressure, temperature, and/or viscosity changes in the hydrostatic liquid.

U.S. Pat. No. 4,541 285 relates to an improvement of the aforementioned apparatus of U.S. Pat. No. 4,491,016, disclosing, a method and apparatus for measuring a pressure of a liquid in a closed storage tank. A measuring piston is guided in a cylinder and is acted upon on one side by a pressure dependent on the pressure to be measured, the piston being in communication with a force measuring device. In order to compensate for the pressure exerted by gas and/or vapor in the interior space of the tank, that side of the piston opposite to said one side is acted upon by this pressure. This is achieved by enclosing the cylinder and the piston in a container filled with a blocking gas, such as nitrogen. The pressure of the blocking gas in the container is controlled by a regulater, operation of which is controlled by sensing means for sensing the gas and/or vapor pressure in the interior of the tank. As a result, relativly complex equipment is necessary to determine that gas and/or vapor pressure and to compensate for it.

DISCLOSURE OF THE INVENTION

It is an object of the present invention to provide a method and apparatus for measuring a pressure, particularly a stationary or quasi-stationary pressure of a fluid greatly allievating the above-explained problems, in particular the detrimental influence of hydrostatic or pneumatic fluid penetrating in the measuring chamber.

It is a further object of the present invention to provide a method and apparatus for measuring more accurately and in a simpler manner the pressure of a liquid stored in a storage tank.

It is a still further object of the present invention to provide a method and apparatus for accurately measuring the density or/and mass of a liquid stored in a storage tank.

It is a still further object of the present invention to provide a method and apparatus for accurately determining the height of a liquid in a storage tank.

These and other objects are achieved according to the invention by a method and apparatus for measuring the pressure of a gas by controlled removal of excessive hydrostatic fluid comprising a liquid from a chamber in which said gas acts upon a face of a which piston is in contact with a force-measuring element. With the method and apparatus according to the invention it is ensured that any hydrostatic liquid present in the measuring region is removed.

According to one embodiment of the invention, the piston may be differentially subjected to different pressures. Thus, the apparatus according to the invention may be used for determining the height, volume and/or mass of a liquid contained in a storage tank using one or more bubble-tubes immersed into the liquid to different depths.

BEST MODE OF CARRYING OUT THE INVENTION

Figure 1:
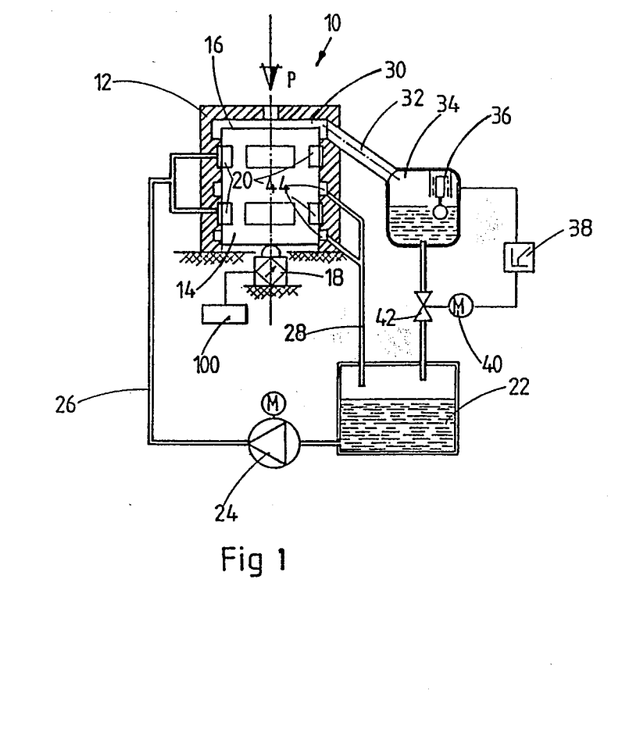
FIG. 1 is a schematic diagram for explaining the principle of the invention.

FIG. 1 shows a first embodiment of a pressure measuring apparatus 10 including a cylinder 12 supported on a base. A piston 14 is guided in cylinder 12 essentially without friction by use of hydrostatic bearings. Between the inner upper face wall of cylinder 12 and the upper face of piston 14 a cylinder to chamber 30 is formed into which a gaseous medium is supplied under the pressure P to be measured. The system for frictionless guidance of a piston 14 in cylinder 12 is more fully explained in U.S. Pat. No. 4,491,016, incorporated herein by reference. In principle, hydrostatic bearings 20 are supplied with hydrostatic liquid from a container 22 by means of a pump 24 and a feed line 26. Exemplarily, the liquid may be oil. Part of the hydrostatic liquid collects in pockets 44 and flows back via return line 28 to container 22. However, some of the hydrostatic liquid leaks into the cylinder chamber 30 which would be filled over time by the hydrostatic liquid, affecting the measured result.

According to the invention, a controlled feedback of the hydrostatic liquid out of the cylinder chamber 30 is provided. For this purpose, a duct 32 connects cylinder chamber 30 with a receptacle 34 in which there is present the same pressure as in cylinder chamber 30. The amount of hydrostatic liquid in the receptacle 34 is now continuously maintained at a predetermined level. This is accomplished by a level detecting device 36, for example, in the form of a floating body the position of which is sensed preferably optically or electrically. Exceeding of a predetermined level by the floating body activates a control device 38, opening by means of a motor 40 an emptying valve 42 until the level of the hydrostatic liquid in the receptacle 34 has been lowered below the predetermined level. Any discharged hydrostatic liquid returns to container 22. Thus, there is provided a closed loop system without the necessity of adding any additional hydrostatic liquid.

It should be noted that due to the inclination of duct 32 from cylinder chamber 30 downward to receptacle 34 any leaked hydrostatic liquid will flow to the receptacle 34 by gravity. Furthermore, as more fully explained in U.S. Pat. No. 4,491,016 the pressure at the hydrostatic bearings 20 is kept at least as high as and preferably higher than the pressure P to be measured in order to prevent penetration of any gas into the hydrostatic bearings 20 and the pocket 44.

As may be gathered from FIG. 1, piston 14 acts on a force measuring element 18 which may be of any suitable type, e.g., a strain gauge or a piezo-resistive force measuring element connected to an evaluation means 100.

The embodiment according to FIG. 1 illustrates the principle of the measuring apparatus according to the invention which may be modified in a variety of ways.

Figure 2:
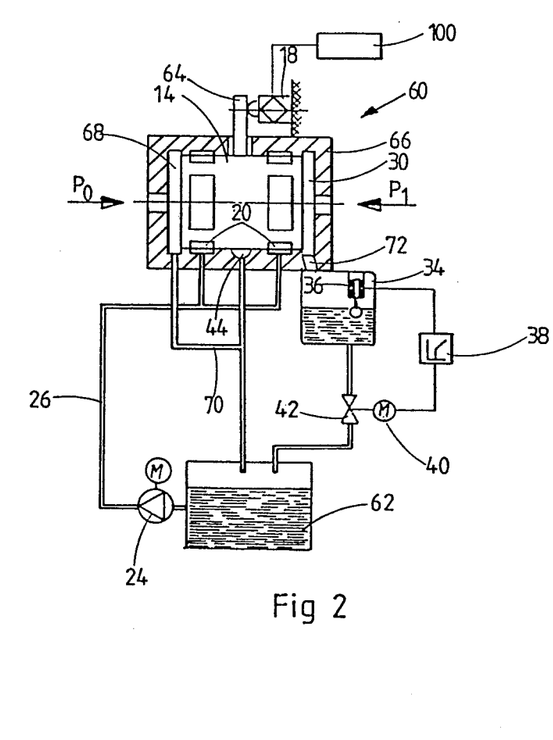
FIG. 2 is a schematic diagram illustrating an embodiment of the apparatus according to the invention for measuring a differential pressure.

FIG. 2 shows a second embodiment of the measuring apparatus according to the invention for measuring a differential pressure $P_1-P_0$ using one piston 14 and one force measuring element 18 only. As far as the design is the same as with the embodiment according to FIG. 1 similar reference numerals are used. Again, cylinder chamber 30 is connected to receptacle 34 by a passage 72. It should be noted that emptying of the cylinder chamber 30 is enhanced by the horizontal orientation of the central axis of movement of cylinder 14. Further to the cylinder chamber 30 there is provided a second cylinder chamber 68 at the opposite face of piston 14 which chamber is under the pressure $P_0$ whilst pressure $P_1$ is applied to the first cylinder chamber 30. The second cylinder chamber 68 is drained via duct 70 being connected to the return line for pocket 44. Cylinder 14 acts on the force measuring element 18 by means of an arm 64 extending through a side opening of cylinder 66 of the differential pressure measuring apparatus 60. Container 62 corresponds to container 22 for hydrostatic liquid. It should be noted that in contrast to container 22 container 62 is closed, so that there is a pressure within the container 62 preventing gas from second cylinder chamber 68 from escaping through drain duct 70.

Figures 3, 6:
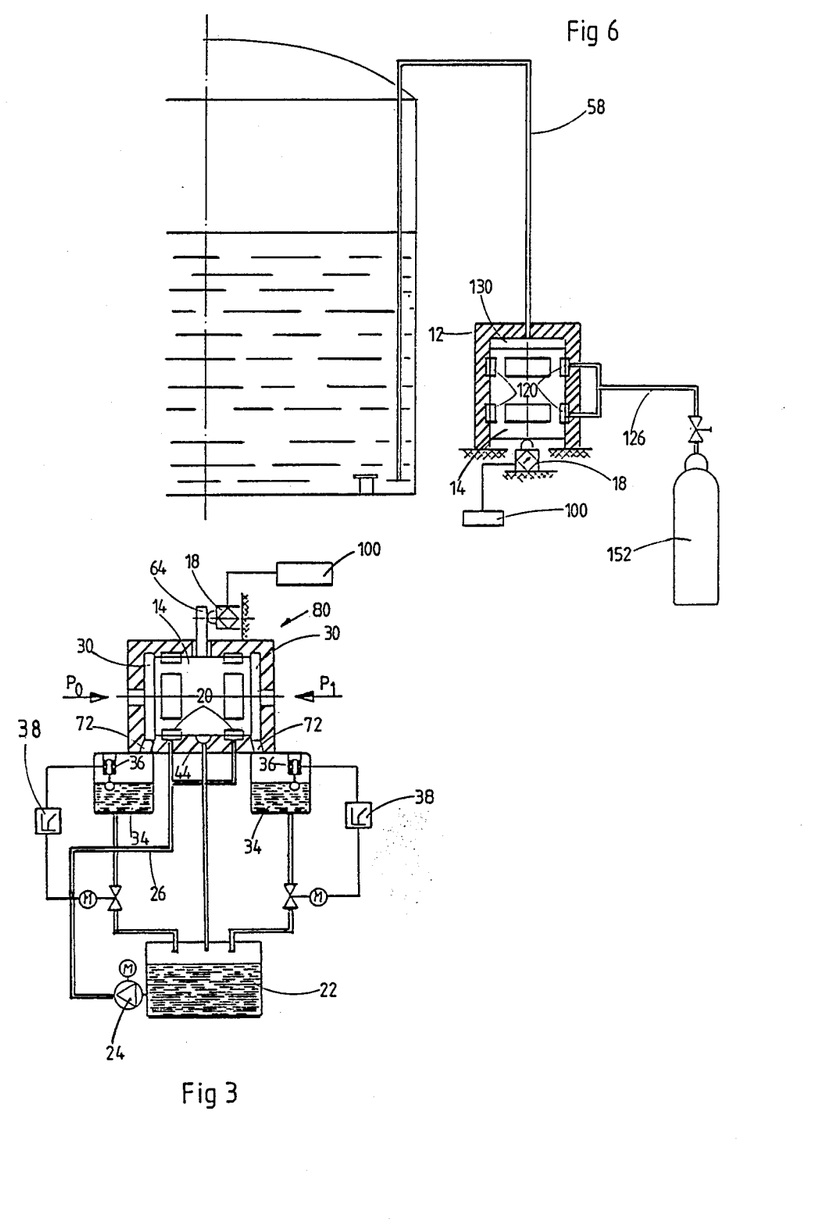
FIG. 3 is a schematic diagram of a further embodiment of the apparatus of the invention as a modification of the embodiment of FIG. 2.
FIG. 6 is a schematic diagram showing a still further embodiment of the measuring apparatus according to the invention using a gaseous medium instead of a hydrostatic liquid, in principle.

Alternatively, a differential pressure measuring apparatus may be designed in symmetric form, as shown in FIG. 3, as a differntial pressure measuring apparatus 80 operating with an open container 22.

Figure 4:
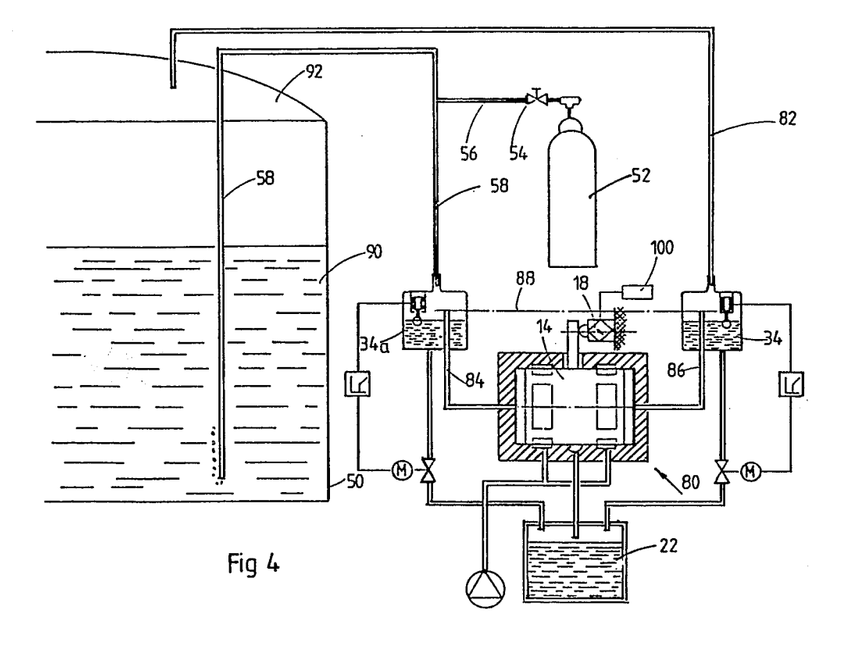
FIGS. 4 and 5 are schematic diagrams illustrating the application of a measuring apparatus according to FIG. 2 in connection with the measurement of the volume of liquid contained in a storage tank.

The pressure measuring apparatuses according to the invention may be used in a variety of ways. FIG. 4 shows a preferred application for determining the volume of a liquid 90 of a closed strorage tank 92. The volume may then be used for calculating the mass of the liquid by multiplying the volume by the density of the liquid.

With this embodiment, the well-known method using a bubble tube 58 is applied where the pressure in bubble tube 58 is equal to the hydrostatic pressure in the storage tank at the level of the opening of bubble tube 58 when supplying gas to bubble tube 58 such that bubbles are emanating from the tube. The gas is supplied from a supply container 52 through a control valve 54 and a feed line 56, the other end of the bubble tube 58 being connected to the upper region of receptacle 34a. For determining the mass or the volume of liquid 90 in a closed storage tank 92 it is necessary to take into account the pressure of the vapor formed above the liquid in the storage tank 92. Thus, this pressure is applied via line 82 to receptacle 34 and a line 86 onto the one face of piston 14 whilst the pressure on bubble tube 58 is applied from the receptacle 34a and a line 84 to the other face of this piston. The force measuring element 18 indicates the differential pressure which may then be used in known manner to calculate the mass of the liquid, taking into consideration the dimensions of the storage tank 92 by evaluation means 100.

With this embodiment, the hydrostatic liquid first fills the cylinder chambers and then rises in the lines 84, 86 until it overflows into the receptacle 34a, 34, respectively. The open ends of lines 84, 86 are preferably arranged at the same horizontal level. Gas pressure is exerted to piston 40 via the lines 84 and 86, the differential pressure being measured by force measuring element 18 and then used to calculate the mass of the liquid 90 within container 92.

Figure 5:
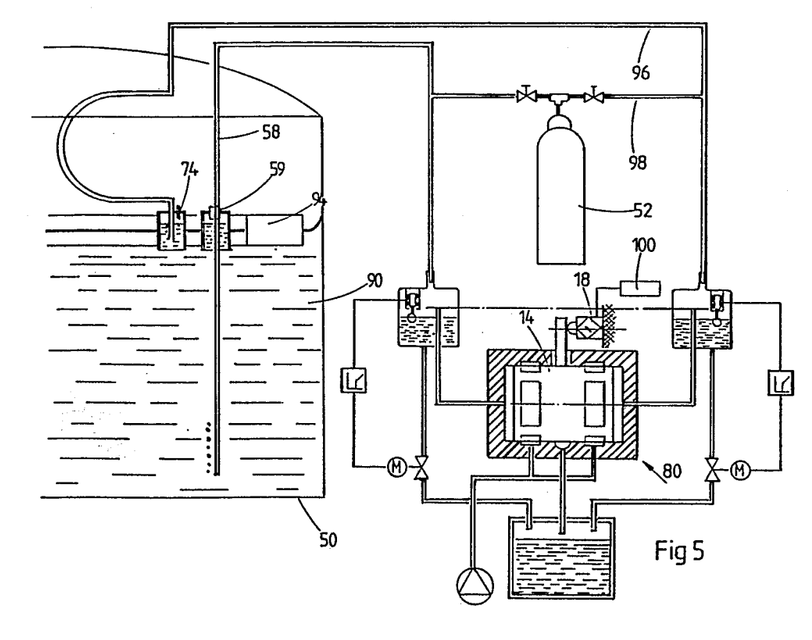

FIG. 5 shows a modification of the system according to FIG. 4 where the liquid in the container is covered by a swimming roof 94. In this case, the apparatus according to the invention is used to compensate the mass of the swimming roof as such that the mass of liquid 90 in storage tank 50 may be measured accurately.

With this embodiment, bubble tube 58 is passed through the swimming roof at sealing passage 59. Alternatively, the bubble tube may sealingly enter the storage tank 50 at any appropriate position horizontally through the side wall as illustrated in connection with another embodiment according to FIG. 9.

In the embodiment of FIG. 5 a further bubble tube 96 ends in a cylinder 74 extending through swimming roof 94 and has its top closed and its bottom open. The open end of the further bubble tube 96 is arranged at the level of swimming roof 94. It is flexible in the region of the storage tank such that it may follow any up and down movement of the swimming roof 94. In cylinder 74 liquid will rise to a level corresponding to the pressure exerted by swimming roof 94 onto liquid 90. Bubble tube 96 determines this pressure and transmits it to one face of piston 14 whilst at the other face of the piston that pressure is applied as determined by the first bubble tube 58. Again, measuring element 18 determines the differential pressure which may be used for calculating the mass of the storage tank contents in evaluation means 100.

Figure 7:
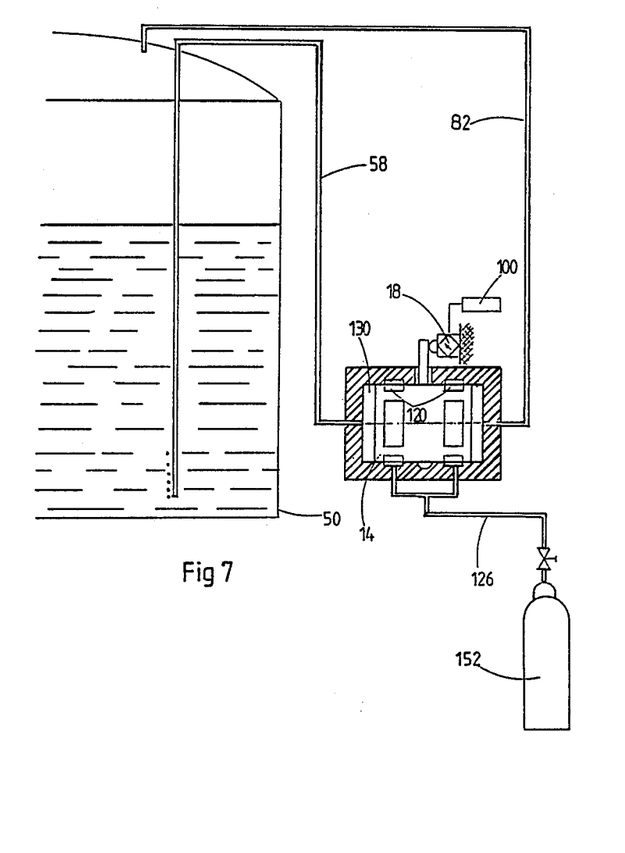
FIGS. 7 and 8 are schematic diagrams similar to those of FIGS. 4 and 5, using the measuring apparatus according to FIG. 6.
Figure 8:
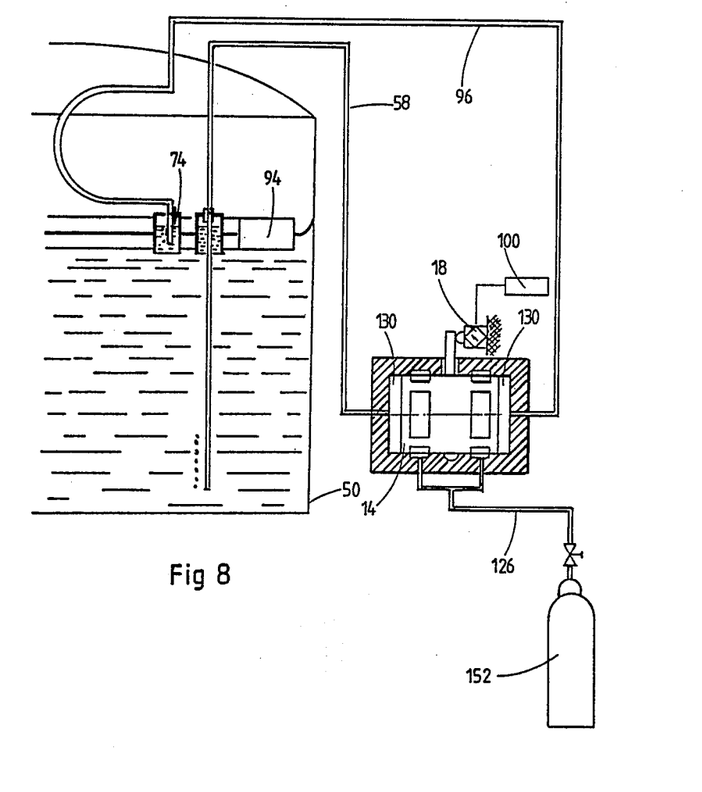

FIGS. 6 to 8 show the application of a modified pressure measuring apparatus accoring to the invention for storage weighing systems according to FIGS. 4 and 5.

FIG. 6 illustrates the principle of the modified pressure measuring apparatus according to the invention. Again, piston 14 is guided within cylinder 12 essentially without friction and acts upon force measuring element 18. In this connection, it should be noted that with varying pressure there is only a very slight vertical movement of piston 14. In contrast to the embodiments explained previously, in this case instead of a hydrostatic liquid a gaseous medium is used. As compared with the systems according to FIGS. 4 and 5, there is a surprising simplicity since no separate gas supply is required for bubble tube 58 since the gas penetrating through bearings 120 into cylinder chamber 130 is used for causing the bubbling. The gaseous medium, preferably air is supplied from a preferably adjustable gas source 152 via line 126 to bearings 120.

Whilst FIG. 6 illustrates a measuring apparatus for measuring absolute pressure similar to the embodiment according to FIG. 1, FIG. 7 shows a differential pressure measuring apparatus 180 corresponding to the system of FIG. 4. As with the embodiment of FIG. 6, no specific means are necessary for removing any hydrostatic liquid since the gas used for bearings 120 and penetrating in cylinder chambers 130 is used for supplying bubble tube 58.

The embodiment according to FIG. 8 corresponds to that of FIG. 5 by employing a differential pressure measuring apparatus 180 using gas for frictionless bearings guiding piston 14.

In particular, embodiments according to FIGS. 7 and 8 show the considerable simplification of the system for determining the contents of storage tanks for explosive liquids. No specific means are necessary for preventing an explosion.

With the embodiment of FIG. 1, in some applications receptacle 34 may be used as container 22 with its liquid level controlled by operation of pump 24.

The level in receptacle 34 may be regulated to a constant value by variably opening valve 42 such that the quantity of hydrostatic liquid removed from receptacle 34 exactly corresponds to the quantity penetrating to cylinder chamber 30.

Preferably, the standard level in receptacle 34 will be selected below the level of the upper face 60 of piston 14 such that any penetrating hydrostatic liquid will drain through receptacle 34.

In connection with determining the contents of a storage tank without a swimming roof, an inert gas such as nitrogen is preferred to prevent any explosions.

Figure 9:
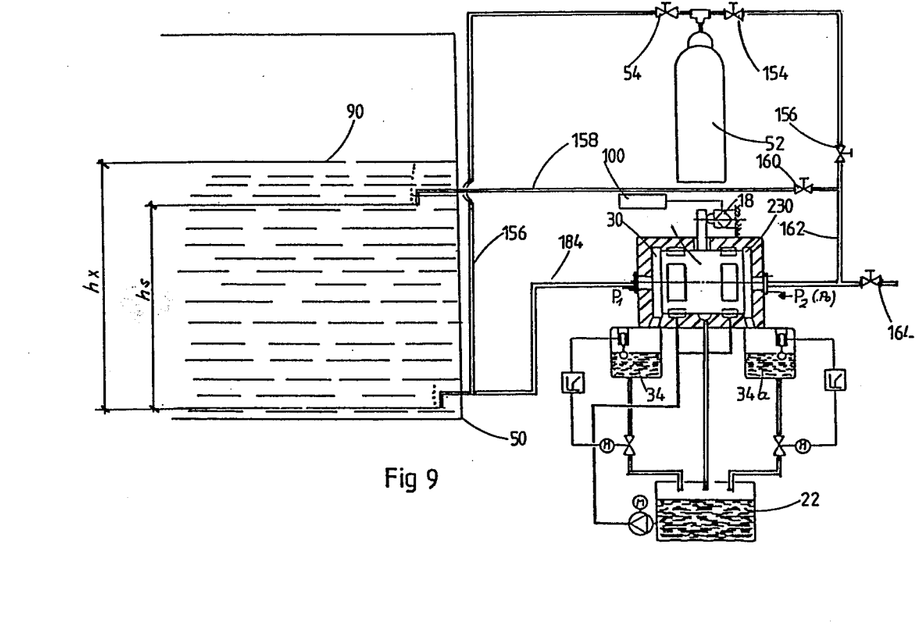
FIG. 9 is a schematic diagram illustrating the use of a measuring apparatus according to the invention for determining the density of a liquid fluid stored in a storage tank.
Figure 10:
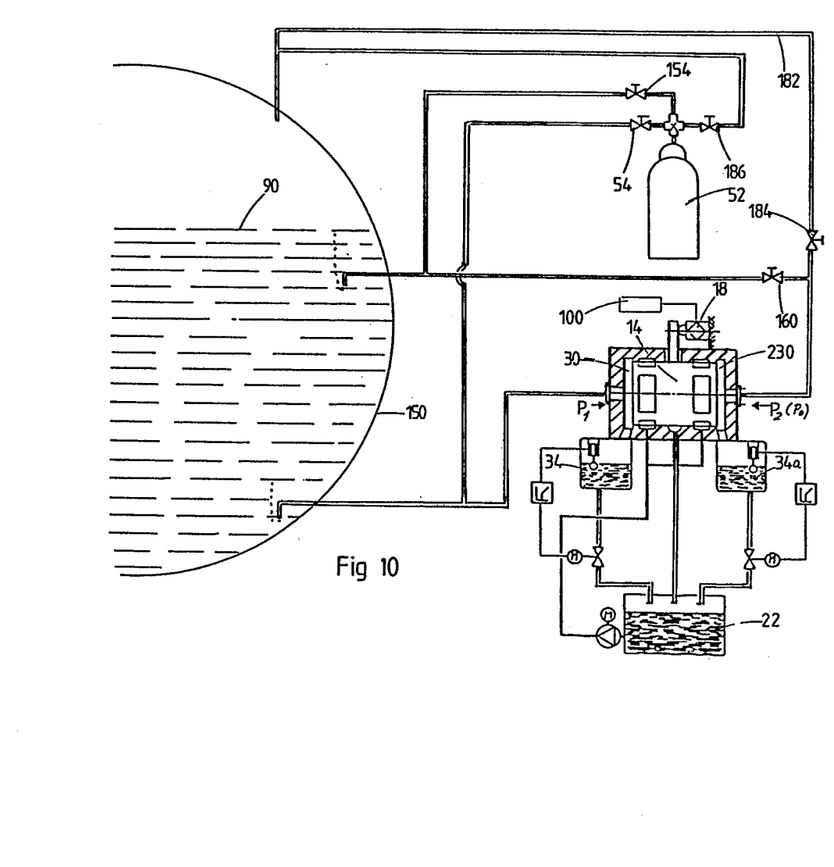
FIG. 10 is a schematic diagram illustrating the use of a measuring apparatus according to the invention for determining the height, volume and/or the mass of a liquid fluid contained in a storage tank having a spherical configuration.

FIGS. 9 and 10 show embodiments where, by using the pressure measuring apparatus according to the invention, the density $\rho$ and the actual height of a liquid contained in a storage tank of varying cross section may be determined. These parameters may be necessary for calculating the mass and volume of the liquid more accurately in evaluations means 100.

It should be noted that the embodiment of FIG. 3 of the measuring apparatus according to the invention is exemplarily used for the systems according to FIGS. 9 and 10. However, any other of the embodiments may be used as well.

As indicated above, the measuring systems according to FIGS. 9 and 10 are intended for use to measure the actual height, volume and/or mass of a liquid in a storage tank. The physical relations are commonly known as follows:

$$p = h_x \cdot \rho \cdot g \text{ and } \Delta p = h_s \cdot \rho \cdot g$$

resulting in $$h_x = h_s \frac{\Delta p}{p}$$

furthermore $$M = \rho \cdot V \text{ and } M = \rho \cdot V \text{ and } V = \int_0^{h_x} Q(x)dx$$

where
p=hydrostatic pressure between the liquid surface and the end of the lower bubble tube;
p=hydrostatic pressure difference between the ends of the two bubble tubes;
$h_s$=height difference between the ends of the bubble tubes;
$h_x$=height of the liquid above the end of the lower bubble tube;
$\rho$=density of the liquid;
M=mass of the liquid;
V=volume of the liquid;
Q(x)=variable tank cross section at height $h_x$.

For determining the height, volume and/or mass of the liquid, FIG. 9 shows a first embodiment using the pressure measuring apparatus according to FIG. 3 in connection with a liquid 90 contained in a generally cylindrical storage tank 50. A gas source 52, supplies a gas, e.g., air, preferably controlled by a valve 54, to a first bubble tube 156 connected by means of a line 184 with the left cylinder chamber 30. Through a further control valve 154 and the open valves 156, 160 a second bubble tube 158 is supplied with gas as well. Between the two valves 156 and 160 a line 162 is connected leading to the right cylinder chamber 230. The cylinder chamber 230 may be supplied with atmospheric pressure or any other desired pressure when closing valves 156, 160 and opening valve 164. With valves 160, 164 closed and valve 156 open, gas source 52 is connected to the right cylinder chamber 230.

The operation of the measuring system according to FIG. 9 is as follows: with valves 156, 160 open and valve 164 closed, gas is supplied from gas source 52 to the bubble tubes 156, 158 in which pressures $p_1$ and $p_2$, respectively, are building up depending on the height of the liquid 90 in storage tank 50. The force-measuring element 18 indicates the differential pressure $\Delta p = p_1 - p_2$, supplied to the evaluation means 100 which determines the density $\rho$ on the basis of the above-mentioned equations. Now valves 156, 160 are closed and, with the storage tank 50 having an open configuration, opening of valve 164 applies atmospheric pressure to the right cylinder chamber 130. Now force measuring element 18 measures the differential pressure $p=p_1-p_0'$ where $p_0'$ is the atmospheric pressure. By means of the above-identified equations evaluation means 100 determines the actual height $h_x$ of the liquid which might serve as an exact indication of the filled condition of storage tank 50. Furthermore, actual height $h_x$ may be used for calculating the exact volume of liquid as well as the mass thereof in consideration of density $p$. It should be noted that, by means of a computable or predetermined calibration characteristic, any deformation of storage tank 50 may be taken into account with this calculation by a person having reasonable skill in the art.

This situation is of particular importance in connection with a storage tank having a varying cross section.

As an example, FIG. 10 shows a storage tank 150 having a spherical configuration. As a further modification of the embodiment of FIG. 9, it is assumed that storage tank 150 is a closed tank. Here, the gas pressure in the upper region of the tank above the liquid, as explained in connection with the embodiments of FIGS. 4 and 7, is now applied via a line 182 and valve 184 to the right cylinder chamber 230 with valve 160 being closed.

The operation of this measuring system is similar to that of FIG. 9 with the exception that instead of the atmospheric pressure $p_0$, by opening of valve 184 and closing of valve 160, gas pressure $p_0'$ from the upper region of the tank is applied to the right cylinder chamber 230. The hydrostatic pressure of the liquid is then $p=p_1-p_0'$. In consideration of the above-identified equations, the actual height $h_x$ of the liquid as well as the volume and/or the mass of the liquid in storage tank 150 may now be determined.

If desired, by opening a valve 186 gas may be supplied from gas source 52 into the upper region in tank 150 which results in an offset of the pressure situation.

The forgoing description shows that a very simple and very accurate measuring apparatus is provided. It should be noted that there is no need for extra means for preventing explosions. Furthermore, the measuring apparatus may be easily switched between various tanks. The measuring signal is immediately available for further evaluation. Also, a continuous reading when filling the tank or draining exact quantities is possible.

I claim:

1. An apparatus for measuring pressures of gaseous media comprising:
    (a) a piston slidably guided in a cylinder, at least one of said pressures acting on one of two face surfaces of said piston forming a pressure chamber with the interior of said cylinder;
    (b) hydrostatic bearings provided between said piston and said cylinder for relative movement therebetween essentially without friction;
    (c) means for supplying, under pressure, hydrostatic liquid to said hydrostatic bearings;
    (d) at least one receptacle connected to said pressure chamber for receiving any hydrostatic liquid penetrating from said hydrostatic bearings to said pressure chamber;
    (e) means for maintaining a level of said hydrostatic liquid in said receptacle at a predetermined level;
    (f) means for removing hydrostatic liquid from said receptacle under control of said level maintaining means; and
    (g) force measuring means engaging said piston.

2. The apparatus of claim 1 wherein said receptacle is located lower than said pressure chamber such that any hydrostatic liquid may drain from said pressure chamber to said receptacle.

3. The apparatus of claim 1, further comprising drain means for returning hydrostatic liquid from said receptacle to said supply means for recirculation.

4. The apparatus of claim 1 wherein for measuring a difference of two pressures there are provided a first and a second pressure chamber confined at one side by a first and an opposite second of said face surfaces of said piston, said force measuring means measuring for said pressure difference.

5. The apparatus of claim 4 wherein said first and second pressure chambers are each respectively connected to one of two receptacles.

6. The apparatus of claim 4 wherein said supply means comprises a closed container connected to one of said first and second pressure chambers the other being connected to said receptacle.

7. The apparatus of claim 1 wherein a common longitudinal axis of said piston and said cylinder extends in horizontal direction.

8. An apparatus for determining the height, volume, density and/or mass of liquid contained in a storage tank, comprising:
    (a) a piston having two opposite face surfaces, slidably guided in a cylinder essentially without friction by hydrostatic bearings;
    (b) a means for supplying, under pressure, hydrostatic liquid to said hydrostatic bearings;
    (c) a gas supply means;
    (d) at least one bubble tube means connectable to said gas supply means for releasing gas into said liquid at a predetermined level;
    (e) at least one pressure chamber formed within said cylinder, one wall of said pressure chamber being a face surface of said piston, said pressure chamber having applied thereto a pressure existing in said bubble tube when supplied with gas from said gas supply means;
    (f) a force measuring element engaging said piston and adapted to generate a signal indicative of the pressure existing in said bubble tube means;
    (g) at least one receptacle connected to said pressure chamber for receiving any of said hydrostatic liquid that penetrates into said pressure chamber;
    (h) a means for controlled removing of hydrostatic liquid from said receptacle such that said hydrostatic liquid is maintained at a predetermined level in said receptacle; and
    (i) evaluation means for calculating on the basis of said signal said height, volume, density and/or mass of said liquid in said storage tank.

9. The apparatus of claim 8 wherein there are formed a first and a second pressure chamber, confined by a first and an opposite second of said face surfaces of said piston said first pressure chamber being connected to said first bubble tube means whilst said second pressure chamber being connected via a tube with an upper region above said liquid in said storage tank the latter being in a closed configuration.

10. The apparatus of claim 8 wherein there are formed a first and second pressure chamber the latter being connected to a second bubble tube supplied with said gas of said gas supply means.

11. The apparatus of claim 10 wherein said connection to said second pressure chamber may be changed from said second bubble tube to a different pressure supply means.

12. The apparatus of claim 11 wherein said different pressure supply means supplies atmospheric pressure when said storage tank is in an open configuration.

13. The apparatus of claim 11 wherein said different supply means supply pressure existing in an upper region above said liquid in said storage tank the latter being in a closed configuration.

14. The apparatus of claim 8 wherein there is provided a swimming roof in said storage tank swimming on said liquid that there are provided first and second pressure chambers within said cylinder confined by a first and opposite second of said face surfaces of said piston said first pressure chamber being connected to said first bubble tube whilst said second pressure chamber being connected to a second bubble tube ending at a level corresponding to that of said swimming roof and being connected to said gas supply means.

15. A method for determining the height, volume, density and/or mass of liquid contained in a storage tank, comprising the steps:
(a) providing a pressure sensitive means for sensing pressure, comprising a piston, having two opposite face surfaces, slidably guided in a cylinder essentially without friction by hydrostatic bearings;
(b) supplying hydrostatic liquid under pressure to said hydrostatic bearings;
(c) immersing a bubble tube means for releasing bubbles into said liquid in said storage tank, an open end of said bubble tube means being arranged at a predetermined level in said liquid and an opposite end being connected to a pressure chamber formed in said cylinder one wall thereof being formed by a face surface of said piston;
(d) providing a force measuring element for engagement with said piston and for generating a signal thereby corresponding to said engagement;
(e) providing an evaluation means, connected to said force measuring element, for receiving and evaluating said signal therefrom;
(f) supplying a gaseous medium to said bubble tube means;
(g) determining from said signal from said force measuring element indicative of hydrostatic pressure in the bubble tube means said height volume, density and/or mass of said liquid in said storage tank in said evaluation means;
(h) connecting at least one receptacle to said pressure chamber for receiving any of said hydrostatic liquid that penetrates into said pressure chamber; and
(i) controlling removal of hydrostatic liquid from said receptacle such that said hydrostatic liquid is maintained at a predetermined level in said receptacle.

16. The method of claim 15 wherein said cylinder is provided with first and second pressure chambers confined at one side thereof by a first and an opposite second of two faces of said piston comprising the further step of immersing a second bubble tube means into said liquid with its opening at a second predetermined level, connecting said second bubble tube means to said second pressure chamber and supplying a gaseous medium to said second bubble tube means.

17. The method of claim 16 comprising the further steps of disconnecting said second bubble tube means from said second pressure chamber and having a different pressure applied to said second pressure chamber.

18. The method of claim 17 wherein said different pressure is an atmospheric pressure when said storage tank has an open configuration.

19. The method of claim 16 wherein said different pressure is a pressure existing in an upper region above said liquid in said storage tank the latter being of a closed configuration.

20. An apparatus for determining the height, volume, density and/or mass of liquid contained in a storage tank, comprising:
(a) a piston having two opposite face surfaces, slidably guided in a cylinder essentially without friction by pneumostatic bearings;
(b) a gas supply means for supplying, under pressure, gas to said pneumostatic bearings;
(c) at least one pressure chamber formed within said cylinder, one wall of said pressure chamber being formed by a face surface of said piston;
(d) at least one bubble tube means connected to said at least one pressure chamber, immersing into said liquid contained in said storage tank, for releasing gas penetrating into said at least one pressure chamber from said pneumostatic bearings into said liquid at a predetermined level;
(e) a force measuring element engaging said piston and adapted to generate a signal indicative of the pressure existing in said at least one bubble tube means; and
(f) an evaluation means for calculating on the basis of said signal said height, volume, density and/or mass of said liquid in said storage tank.

21. The apparatus of claim 20 wherein there are formed a first and a second pressure chamber, confined by a first and an opposite second of said face surfaces of said piston, said first pressure chamber being connected to a first said bubble tube means and said second pressure chamber being connected with a zone above said liquid in said storage tank, the latter being in a closed configuration.

22. The apparatus of claim 20, wherein there are formed a first and second pressure chamber, said second pressure chamber being supplied with a pressure independent from that existing in said first pressure chamber.

23. The apparatus of claim 22 wherein said pressure is atmospheric pressure when said storage tank is in an open configuration.

24. The apparatus of claim 22 wherein a second bubble tube means for releasing bubbles is connected to said second pressure chamber and immerses into said liquid to a level different from said of said first bubble tube means.

25. The apparatus of claim 20 wherein there is provided a swimming roof in said storage tank swimming on said liquid, and there are also provided first and second pressure chambers within said cylinder confined respectively by said first and opposite second of said face surfaces of said piston, said first pressure chamber being connected to said first bubble tube and said pressure chamber being connected to a second bubble tube ending at a level corresponding to that of said swimming roof.

26. A method for determining the height, volume, density and/or mass of liquid contained in a storage tank, comprising the steps of:
  (a) providing a pressure sensitive means for sensing pressure, comprising a piston, having two opposite face surfaces, slidably guided in a cylinder essentially without friction by pneumostatic bearings;
  (b) supplying a gaseous medium, under pressure, to said pneumostatic bearings;
  (c) immersing a bubble tube means for releasing bubbles into said liquid in said storage tank, an open end of said bubble tube means being arranged at a predetermined level in said liquid and an opposite end being connected to a pressure chamber formed in said cylinder one wall thereof being formed by a face surface of said piston, said at least one bubble tube means releasing gaseous medium penetrating into said pressure chamber from said pneumostatic bearings, into said liquid;
  (d) providing a force measuring element for engagement with said piston for generating a signal indicative of the pressure existing in said bubble tube means; and
  (e) determining with the use of said signal the height, volume, density and/or mass of said liquid in said storage tank.

27. The method of claim 26 wherein said cylinder is provided with first and second pressure chambers confined at one side thereof by a first and an opposite second of said two face surfaces of said piston, comprising the further step of applying a pressure to said second pressure chamber independent from a pressure existing in said bubble tube means connected to said first pressure chamber.

28. The method of claim 27 wherein said pressure in said second pressure chamber is atmospheric pressure when said storage tank has an open configuration.

29. The method of claim 27 wherein said pressure in said second pressure chamber is the pressure existing in a second bubble tube means for releasing bubbles, connected to said second pressure chamber and extending into said storage tank.

30. The method of claim 29 wherein said second bubble tube means immerses into said liquid and has an open end arranged at a further predetermined level different from said level of said first bubble tube means.

31. The method of claim 29 wherein said pressure in said second pressure chamber is a pressure existing in a zone above said liquid in said storage tank with the latter being of a closed configuration.

* * * * *